United States Patent
Jafarian et al.

(10) Patent No.: US 10,122,438 B2
(45) Date of Patent: Nov. 6, 2018

(54) SYSTEMS, METHODS AND DEVICES FOR MODIFYING RELAY OPERATION OF A WIRELESS DEVICE

(71) Applicant: QUALCOMM Incorporated, San Diego, CA (US)

(72) Inventors: Amin Jafarian, Princeton, NJ (US); Luiza Timariu, San Diego, CA (US); George Cherian, San Diego, CA (US); Ronald Houston Gibson, Jr., San Diego, CA (US); Abhishek Pramod Patil, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 14/527,232

(22) Filed: Oct. 29, 2014

(65) Prior Publication Data
US 2015/0124695 A1  May 7, 2015

Related U.S. Application Data

(60) Provisional application No. 61/899,095, filed on Nov. 1, 2013.

(51) Int. Cl.
H04B 7/14 (2006.01)
H04B 7/155 (2006.01)
H04W 88/04 (2009.01)

(52) U.S. Cl.
CPC ........ *H04B 7/15557* (2013.01); *H04W 88/04* (2013.01)

(58) Field of Classification Search
CPC ... H04W 88/04; H04W 76/022; H04W 68/04; H04L 67/104; H04B 7/15557
(Continued)

(56) References Cited

U.S. PATENT DOCUMENTS

2002/0183038 A1* 12/2002 Comstock ............... H04L 12/14
                                              455/406
2003/0060202 A1*  3/2003 Roberts .................. H04L 45/00
                                              455/445
(Continued)

FOREIGN PATENT DOCUMENTS

JP    2012527134 A    11/2012

OTHER PUBLICATIONS

International Search Report and Written Opinion—PCT/US2014/063156—ISA/EPO—dated Feb. 20, 2015.
(Continued)

*Primary Examiner* — Sai Ming Chan
(74) *Attorney, Agent, or Firm* — Knobbe, Martens, Olson & Bear, LLP

(57) ABSTRACT

Systems, methods and devices for modifying relay operation of a wireless device are disclosed. In one aspect an apparatus for modifying relay operation of a wireless node comprises a processing system configured to generate a message requesting the wireless node to enable access point operation of the wireless node or instructing the wireless node to disable the access point operation of the wireless node. The message comprises a relay activation information element. The message comprises one or more of a field indicating a time for the wireless node to enable the access point operation or disable the access point operation and a field indicating whether the message is requesting the wireless node to enable the access point operation or instructing the wireless node to disable the access point operation.

30 Claims, 5 Drawing Sheets

(58) Field of Classification Search
USPC .......................................................... 370/315
See application file for complete search history.

(56) References Cited

U.S. PATENT DOCUMENTS

| | | | | |
|---|---|---|---|---|
| 2008/0267116 | A1* | 10/2008 | Kang | H04L 45/20 370/328 |
| 2009/0282155 | A1* | 11/2009 | Ali | H04W 76/022 709/228 |
| 2011/0134833 | A1* | 6/2011 | Gogic | H04W 52/0206 370/328 |
| 2013/0182693 | A1* | 7/2013 | Sperling | H04W 52/0229 370/338 |

OTHER PUBLICATIONS

Jafarian A. et al., "Comment Resolution for Subclauses 9.32.n"; IEEE P802.11 Wireless LANs; Draft; IEEE-SA Mentor, Piscataway, NJ USA, doc.: IEEE 802.11-13/1139r0, Sep. 16, 2013 (Sep. 16, 2013), pp. 1-5, XP068063059.

Jafarian A., " Comment Resolution for Subclauses", IEEE P802.11 Wireless LANs; Draft; IEEE-SA Mentor, Piscataway, NJ USA, doc.: 802.11-11-13/1140r1, Sep. 18, 2013 (Sep. 18, 2013), pp. 1-8, XP068063061.

Wong E. et al., "Proposed TGah Draft Amendment"; IEEE P802.11 Wireless LANs; IEEE-SA Mentor, Piscataway, NJ USA, doc.: IEEE 802.11-13/0500R0, May 10, 2013 (May 10, 2013), pp. 1-330, XP068054010.

Sun B., "TGah D0.1 Comment Resolutions on MAC", IEEE P802.11 Wireless LANs; IEEE-SA Mentor, Piscataway, NJ USA, doc..IEEE 802.11-13/0828r0, Jul. 16, 2013 (Jul. 16, 2013), pp. 1-4, XP068054461.

Sun B. et al., "TGah D0.1 Comment Resolutions on MAC", IEEE P802.11 Wireless LANs; IEEE-SA Mentor, Piscataway, NJ USA, doc..IEEE 802.11-13/0828r1, Sep. 14, 2013 (Sep. 14, 2013), pp. 1-5, XP068062757.

IEEE P802.11ah/D0.1, Draft Standard for Information technology—Telecommunications and information exchange between systems Local and metropolitan area networks—Specific requirements, Part 11:Wireless LAN Medium Access Control (MAC) and Physical Layer (PHY) Specifications, Amendment 6: Sub1 Ghz License Exempt, 2013, 430 Pages.

* cited by examiner

SYSTEMS, METHODS AND DEVICES FOR MODIFYING RELAY OPERATION OF A WIRELESS DEVICE

CLAIM OF PRIORITY UNDER 35 U.S.C. § 119

The present Application for Patent claims priority to Provisional Application No. 61/899,095 entitled "SYSTEMS, METHODS AND DEVICES FOR MODIFYING RELAY OPERATION OF A WIRELESS DEVICE" filed Nov. 1, 2013, and assigned to the assignee hereof. Provisional Application No. 61/899,095 is hereby expressly incorporated by reference herein.

BACKGROUND

Field

The present application relates generally to wireless communications, and more specifically to systems, methods, and devices for modifying relay operation of a wireless device.

Background

In many telecommunication systems, relay devices are used to exchange messages among several interacting spatially-separated devices which may not be able to directly communication with one another. Conventionally, a relay device that joins a particular network must remain a relay device for the duration of the association with the network. Likewise, a wireless device joining the network, and not operating as a relay device, must maintain operation as a wireless device, not operating as a relay device, for the duration of the association with the network. Consequently, networks may lose a certain degree of communication efficiency with respect to latency and medium usage, for example, where the relay operation of a particular relay device is no longer required or desired in the network.

SUMMARY

Various aspects of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various aspects allow tuning of medium access parameters.

One aspect of the disclosure provides an apparatus for modifying relay operation of a wireless node. The apparatus comprises a processing system configured to generate a message requesting the wireless node to enable access point operation of the wireless node or instructing the wireless node to disable the access point operation of the wireless node.

Another aspect of the disclosure provides a method for modifying relay operation of a wireless node. The method comprises generating a message requesting the wireless node to enable access point operation of the wireless node or instructing the wireless node to disable the access point operation of the wireless node. The method comprises providing the message for transmission to the wireless node.

Another aspect of the disclosure provides an apparatus for modifying relay operation. The apparatus comprises a processing system configured to generate a message requesting permission to enable access point operation of the apparatus or announcing disabling the access point operation of the apparatus.

Another aspect of the disclosure provides a method for modifying relay operation. The method comprises generating a message requesting permission to enable access point operation or announcing disabling the access point operation. The method comprises providing the message for transmission.

DETAILED DESCRIPTION

Figure 1:
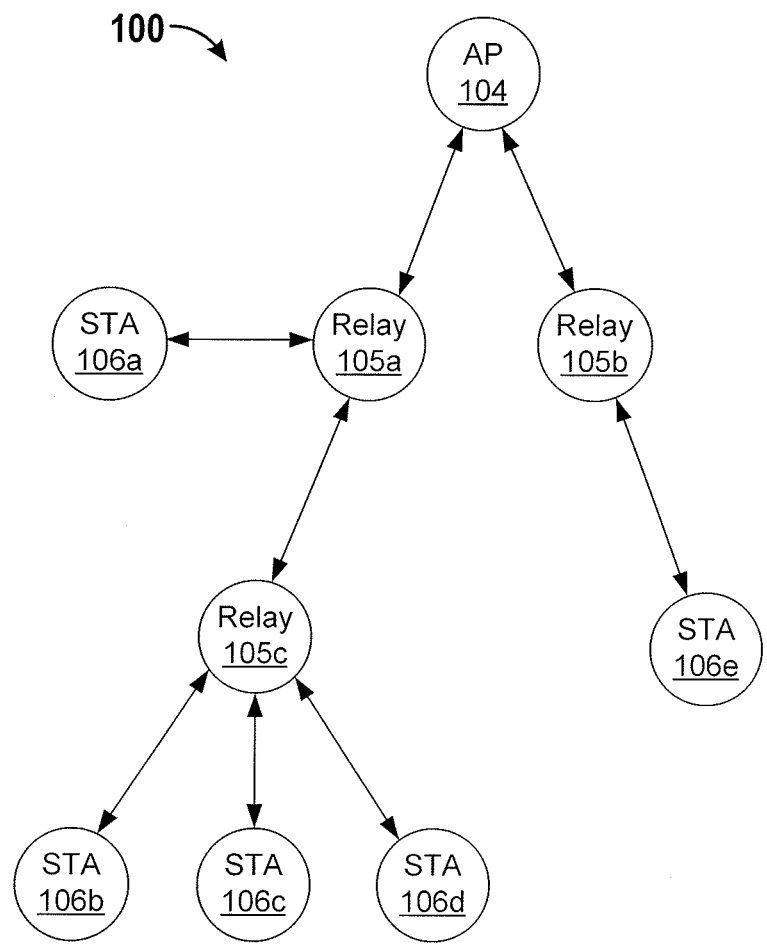
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11 ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some aspects, a WLAN includes various devices which are the components that access the wireless network. For example, there may be three types of devices: access points ("APs"), relays, and clients (also referred to as stations, or "STAs"). In general, an AP serves as a hub or base station for the WLAN, a relay device provides a communication link between the AP for the WLAN and one or more STAs, which serve as users of the WLAN. For example, an STA may be a laptop computer, a personal digital assistant (PDA), a mobile phone, etc. In an example, an STA connects to an AP, through a relay device, via WiFi (e.g., IEEE 802.11 protocol such as 802.11 ah) compliant wireless links to obtain general connectivity to the Internet or to other wide area networks. In some aspects, an STA may also be used as a relay device.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some aspects, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless node may comprise an access terminal ("AT") or STA, an AP or a relay-capable wireless device having at least one of a STA or AP operation, i.e., a wireless node may have AT or STA operation, AP operation, or both AT/STA and AP operations.

As discussed above, certain of the devices described herein may implement the 802.11 ah standard, for example. Such devices, whether used as an STA, a relay device, an AP, or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11 ah standard. The wireless communication system 100 may include an AP 104, which may operate as the "root node" or base station for the wireless communication system 100. The AP 104 may communication with one or more STAs directly or through one or more relay devices. For example, the AP 104 may directly communicate with each of relay devices 105a and 105b. The relay device 105a may directly communicate with STA 106a as well as relay device 105c. The relay device 105c may directly communicate with each of STAs 106b, 106c and 106d. Likewise, the relay device 105b may directly communicate with STA 106e. Where the relay devices 105a-105c are functioning as wireless relays, each of the relay devices 105a-105c may be thought of as comprising a wireless relay STA and a wireless relay AP. When any of the relay devices 105a-105c enable or disable their wireless relay functionality, the relay devices 105a-105c may enable or disable, respectively, their access point operation. Although FIG. 1 shows a particular arrangement of relay devices and STAs, this particular arrangement is merely exemplary and should not be construed as limiting the concepts of the present application to the particular arrangement shown.

A variety of processes and methods may be used for transmissions in the wireless communication system 100 between the AP 104, the relay devices 105a-105c, and the STAs 106a-106e. For example, signals may be sent and received between the AP 104, the relay devices 105a-105c, and the STAs 106a-106e in accordance with OFDM/OFDMA techniques. If this is the case, the wireless communication system 100 may be referred to as an OFDM/OFDMA system. Alternatively, signals may be sent and received between the AP 104, the relay devices 105a-105c, and the STAs 106a-106e in accordance with CDMA techniques. If this is the case, the wireless communication system 100 may be referred to as a CDMA system.

A communication link that facilitates transmission from the AP 104 to one or both of the relay devices 105a and 105b, from the relay device 105a to either of the STA 106a or the relay device 105c, from the relay device 105b to the STA 106e, or from the relay device 105c to any of the STAs 106b-106d may be referred to as a downlink. Contrarily, a communication link that facilitates transmission in the opposite direction from any of the above-mentioned transmissions may be referred to as an uplink. Alternatively, a downlink may be referred to as a forward link or a forward channel, and an uplink may be referred to as a reverse link or a reverse channel. Likewise, any device having an uplink connection with another device may be considered downstream from that device. Similarly, any device having a downlink connection with another device may be considered upstream from that device.

The STAs 106a-106e are not limited in type and may include a variety of different STAs. By way of example and not limitation, the STAs 106a-106e may include a cellular phone, a television, a laptop, and a number of sensors, e.g., a weather sensor or other sensor capable of communicating using a wireless protocol.

Figure 2:
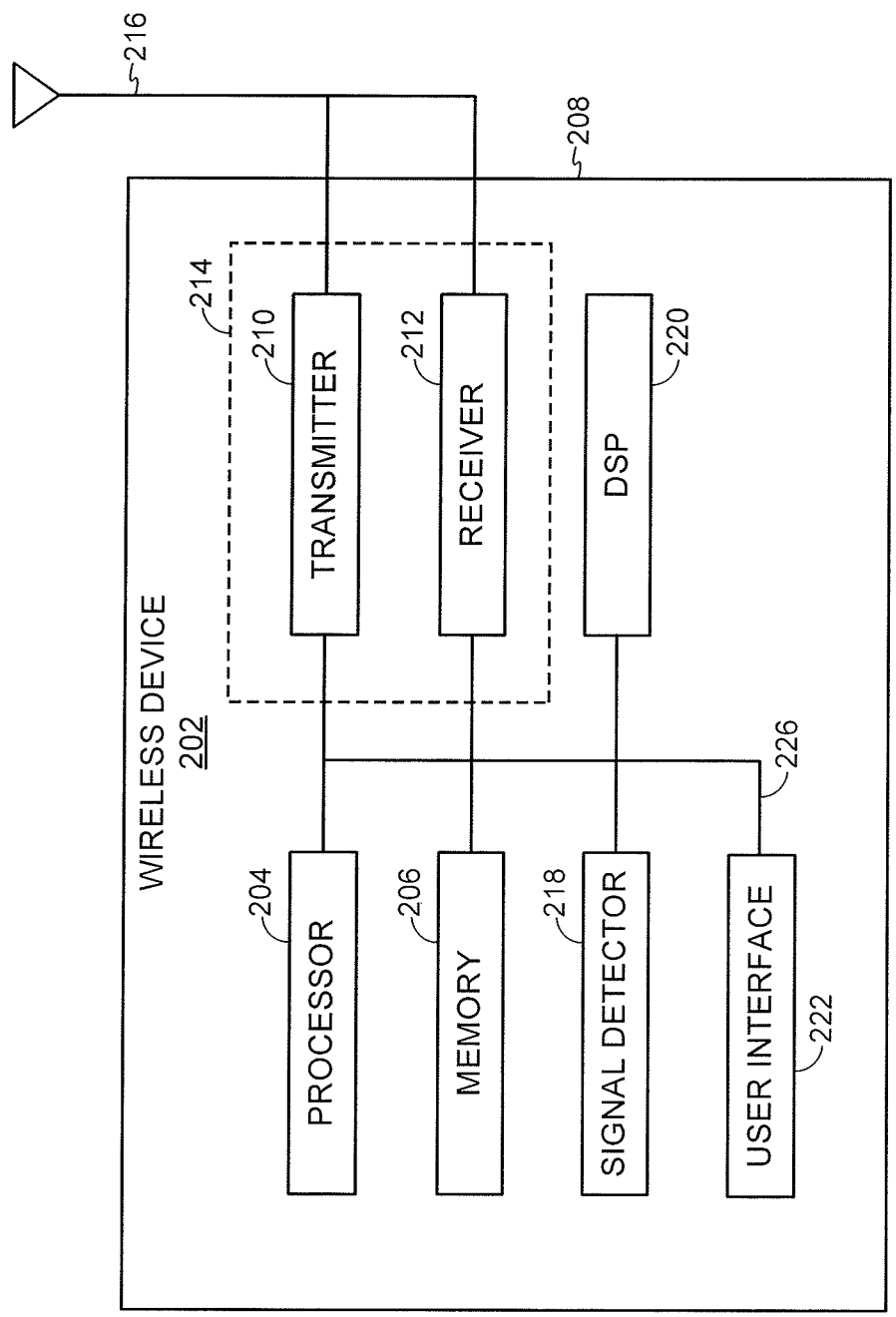
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, one of the relay devices 105a-105c, or one of the STAs 106a-106e, for example.

The wireless device 202 may include a processor 204 which controls operation of the wireless device 202. The processor 204 may also be referred to as a central processing unit (CPU), a hardware processor, or a processing system. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In some implementations, means for generating or processing any message and/or for setting any bits or values of particular fields of any message, as may be further described below, may comprise at least the processor 204.

The processing system may also include a computer program product for communication comprising a computer-readable medium encoded thereon with instructions that, when executed, causes an apparatus to perform one or more steps associated with one or more methods for modifying relay operation of a relay-compatible wireless device. Instructions may include source code format, binary code format, executable code format, or any other suitable format of code. The code, or instructions, when executed by one or more processors, causes the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP, a relay device, or an STA. In some implementations, means for transmitting any message according to or based on any conditions or to achieve any outcome, as may be described in further detail below, may comprise the transmitter 210. Likewise, means for receiving any message according to or based on any conditions or to achieve any outcome, as may be described in further detail below, may comprise the receiver 212. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In aspects as will be described below, a relay activation information element (IE) may be embedded in a relay activation frame and may be utilized by an upstream wireless node, such as an AP, to selectively enable or disable the access point operation of a downstream relay-capable wireless device. For example, as shown in FIG. 1, such a relay activation IE may be sent by the AP 104 to the relay device 105b to instruct the relay device 105b to disable its access point operation. Where the relay device 105b provides relay functionality to/from a downstream device such as the STA 106e before the instruction to disable its access point operation, the relay device 105b may additionally generate at least one dissociation message for dissociating with the STA 106e as a relay device. Where the relay device 105b, for example, has previously been instructed to disable its wireless relay AP, and is currently operating as a non-relay wireless STA, the relay activation IE may be sent by the AP 104 to the relay device 105b requesting that the relay device 105b enable its access point operation. For such a request from an upstream device, the relay device 105b may make its own determination as to whether or not to comply with the request. In such a case, the relay device 105b, for example, may send a response acknowledging the request to enable its access point operation and then enable the access point operation. In the alternative, the relay device 105b may not send a response and enable its access point operation. In yet another aspect, the relay device 105b may negotiate a time during which it will enable its access point operation, as will be described in more detail below. In yet another aspect, the AP 104 may instruct or force the relay device 105b to enable its access point operation. In such an aspect, the relay device 105b may send a response acknowledging the instruction to enable its wireless access point operation and then enable the access point operation. In the alternative, the relay device 105b may not send the response acknowledgement and may enable the access point operation if possible, or dissociate if it cannot enable its access point operation. These same options may be available when disabling the access point operation of the relay device 105b, for example.

In another aspect, the relay activation IE may be utilized by the relay device itself to request or announce a modification in the relay device's own relay operation functionality. For example, as shown in FIG. 1, such a relay activation IE may be sent by the relay device 105b, for example, announcing to the AP 104 upstream that the relay device 105b will disable its access point operation. Alternatively, where the relay device 105b, for example, has previously disabled its access point operation, and is currently operating as a non-relay wireless STA, the relay device 105b may send the relay activation IE to the AP 104 requesting permission to enable the access point operation of the relay device 105b. For such a request from a downstream relay device, the AP 104 may make the determination of granting or denying the request from the relay device 105b. In such a case, the access point 104, for example, may send a response acknowledging the request to enable the access point operation of the relay device 105b. The relay device 105b may then enable the access point operation. In the alternative, the access point 104 may not send a response and the relay device 105b may enable its access point operation. In yet another aspect, the access point 104 may negotiate a time during which the relay device 105b will enable its access point operation, as will be described in more detail below. In yet another aspect, the relay device 105b may instruct or force enablement of its access point operation. In such an aspect, the access point 104 may send a response acknowledging the instruction that the relay device 105b will enable its wireless access point operation and then the relay device 105b may enable its access point operation. In the alternative, the access point 104 may not send the response acknowledgement and the relay device 105b may enable its access point operation if possible, or dissociate if it cannot enable its access point operation. These same options may be available when disabling the access point operation of the relay device 105b, for example.

Figure 3:
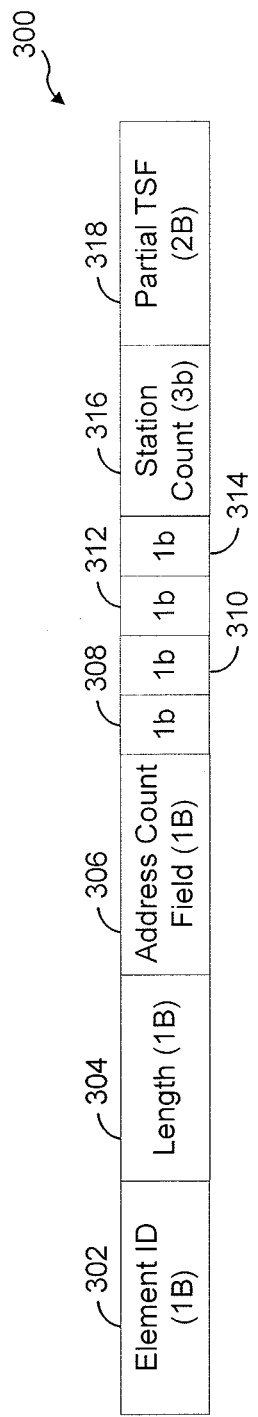
FIG. 3 shows a message for modifying a relay operation of a wireless device, in accordance with one aspect.

FIG. 3 shows a message for modifying a relay operation of a wireless device, in accordance with one aspect. Specifically, FIG. 3 shows a relay activation information element (IE) 300 for modifying a relay operation of a wireless device. Those skilled in the art will appreciate that the relay activation IE may have more components than illustrated in FIG. 3. As shown, the relay activation IE 300 includes only those components useful for describing some prominent features or aspects within the scope of the claims, and may include one or more additional fields that are not shown. The relay activation IE 300 includes Element ID field 302, which may be 1 byte in length for example, and may include a value indicating that the IE is a relay activation IE. The relay activation IE 300 further includes a length field 304, which may also be 1 byte in length for example, and may include an integer value indicating the total length of the relay activation IE 300 in bytes. The relay activation IE 300 may further include an address count field 306, which may also be 1 byte in length for example, and may include an integer value indicating a number of reachable addresses that may be included in a variable-length reachable address field (not shown) of the IE. The relay activation IE 300 may further include a Request/Response indication field 308, which may be 1 bit long for example, and may indicate whether the relay activation IE 300 is a request IE or a response IE. For example, when the relay activation IE 300 is sent by the wireless device requesting or instructing a modification in the relay operation functionality of either itself or of another downstream wireless device, the Request/Response indication field may be set to "1" for example, indicating that the IE is a request. Alternatively, when the relay activation IE 300 is sent back to the requesting wireless device for indicating either acceptance or denial of the request to modify relay operation, the Request/Response indication field 308 may be set to "0".

The relay activation IE 300 may further include an Activate/Deactivate relay operation field 310, which may be 1 bit long for example, and may indicate whether the relay activation IE 300 is requesting (or instructing) the target wireless device to activate or deactivate its access point operation. For example, if the relay activation IE 300 indicates activation of relay operation, the Activate/Deactivate relay operation field 310 may be set to "1" for example, while for an indication for deactivation of relay operation the field 310 may be set to "0". Where the relay activation IE 300 is a response, having the Request/Response indication field 308 set to "0", an indication of granting or denying the requested deactivation may be made in the Activate/Deactivate relay operation field 310. For example, where a request is granted or complied with, the Activate/Deactivate relay operation field 310 in the response relay activation IE 300 may be set to the same value that the Activate/Deactivate relay operation field 310 in the request relay activation IE 300 was set to. Where a request is denied or not complied with, the Activate/Deactivate relay operation field 310 in the response relay activation IE 300 may be set to the opposite value that the Activate/Deactivate relay operation field 310 in the request relay activation IE 300 was set to.

The relay activation IE 300 may further include a currently serving stations indication field 312, which may be 1 bit long, and may indicate whether or not the relay device is currently serving any stations as a relay. For example, where the relay activation IE 300 is generated by a relay device currently serving at least one wireless station as a relay, the currently serving stations indication field 312 may be set to "1". Contrarily, where the relay activation IE 300 is either generated by an upstream AP or generated by a relay device not currently serving a wireless station as a relay, the currently serving stations indication field 312 may be set to "0".

Where the currently serving stations indication field 312 is set to "1", the relay activation IE 300 may further include a station count field 316, which may be 3 bits in length for example, and may indicate a number of stations the relay device is currently serving in a relay capacity. Since the station count field 316 is 3 bits in length, it may include any value from 0 to 7, where an indication of 7 may be construed in some aspects as indicating 7 or more wireless stations currently being served. Where the currently serving stations indication field 312 is set to "0" the relay activation IE 300 may not include the station count field 316.

The relay activation IE 300 may further include a suggested time indication field 314, which may be 1 bit in length, and may indicate whether the relay activation IE 300 further includes a partial time synchronization function (TSF) field 318, as discussed below, which may indicate a future time at which the relay operation modification is requested or instructed to occur. Thus, if the requested or instructed modification to relay operation is to occur at some future time, the suggested time indication field 314 may be set to "1". Contrarily, where the requested or instructed modification to relay operation is to occur in real-time, or has already occurred, the suggested time indication field 314 may be set to "0".

When the suggested time indication field 314 is set to "1", the relay activation IE 300 may further include a partial TSF field 318, which may be 2 bytes in length for example, and may indicate a time in the future at which the relay operation modification is requested or instructed to occur. Similar to the operation of the Activate/Deactivate relay operation field 310 described above, an indication of granting or denying the requested modification at the time specified in the partial TSF field 318 of a requesting relay activation IE 300 may be made in the partial TSF field 318 of the response relay activation IE 300. For example, where a request to modify the relay operation at the time in the future is granted or complied with, the partial TSF field 318 in the response relay activation IE 300 may be set to the same value that the partial TSF field 318 in the request relay activation IE 300 was set to. Thus, the device requesting the modification to relay operation at the specified time may determine that the request at that time was granted when a comparison of the value of the partial TSF field 318 set in the requesting relay activation IE 300 matches the value of the partial TSF field 318 set in the response relay activation IE 300. Where the request to modify the relay operation at the specified time is denied or not complied with, an alternative time may be indicated by the responding device by setting the partial TSF field 318 in the response relay activation IE 300 to the alternative time value. In this way, a time in the future for the modification of the relay operation of a relay device may be negotiated without the need for dissociating with the network in one relay mode and then re-associating with the network in another relay mode. Where the suggested time indication field 314 is set to "0", the relay activation IE 300 may not include the partial TSF field 318.

Figure 4:
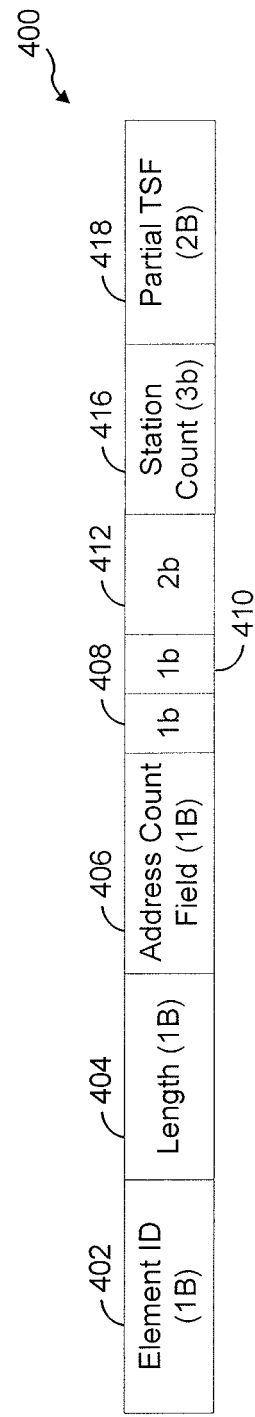
FIG. 4 shows a message for modifying a relay operation of a wireless device, in accordance with another aspect.

FIG. 4 shows a message for modifying a relay operation of a wireless device, in accordance with another aspect. Specifically, FIG. 4 shows another aspect of a relay activation information element (IE) 400 for modifying a relay operation of a wireless device. Those skilled in the art will appreciate that the relay activation IE may have more components than illustrated in FIG. 4. As shown, the relay activation IE 400 includes only those components useful for describing some prominent features or aspects within the scope of the claims, and may include one or more additional fields that are not shown. The relay activation IE 400 includes an Element ID field 402, a length field 404, an address count field 406, and a Request/Response indication field 408, each having characteristics and functionality as previously described in connection with the Element ID field 302, the length field 304, the address count field 306, and the Request/Response indication field 308 of FIG. 3, respectively.

The relay activation IE 400 may further include an Activate/Deactivate relay operation field 410, which may be 1 bit long for example, and may indicate whether the relay activation IE 400 is requesting (or instructing) the target wireless device to activate or deactivate its access point operation. For example, if the relay activation IE 400 indicates activation of relay operation, the Activate/Deactivate relay operation field 410 may be set to "1" for example, while for an indication for deactivation of relay operation the field 410 may be set to "0". In contrast to the previously described functionality of the Activate/Deactivate relay operation field 310, an indication of granting or denying the requested modification may be made in a response indication field 412 as described below, rather than in the Activate/Deactivate relay operation field 410.

The relay activation IE 400 may further include a response indication field 412, which may be 2 bits in length for example, and may indicate a status of a response to a requesting relay activation IE 400. For example, where a request is granted or complied with, the response indication field 412 in the response relay activation IE 400 may be set to a value indicating acceptance of the request to modify the relay operation of a target relay-capable device. Contrarily, where a request is denied or not complied with, the response indication field 412 in the response relay activation IE 400 may be set to a value indicating rejection of the request to modify the relay operation of a target relay-capable device. Where the responding wireless device proposes a new time for the modification to occur rather than rejecting the request to modify at the time proposed by the requesting device, the response indication field 412 may be set to a value indicating that a new time for the requested modification is proposed.

Where the relay activation IE 400 is generated by a relay-capable device, the relay activation IE 400 may further include a station count field 416, which may be 3 bits in length for example, and may indicate a number of stations the relay device is currently serving in a relay capacity. Like the station count field 316 previously described in connection with FIG. 3, since the station count field 416 is 3 bits in length, it may indicate any value from 0 to 7, where an indication of 7 may be construed in some aspects as indicating 7 or more wireless stations currently being served. Where the relay activation IE 400 is not generated by a relay device the relay activation IE 400 may not include the station count field 416.

The relay activation IE 400 may further include a partial TSF field 418, which may be 2 bytes in length for example, and may indicate a time in the future at which the relay operation modification is requested or instructed to occur. Where the relay activation IE 400 is a requesting relay activation IE, the partial TSF field 418 may indicate a time for a relay-capable device to modify its relay operability. Where the relay activation IE 400 is a response relay activation IE and the response indication field 412 indicates acceptance of or compliance with a request to modify relay operability of a relay-capable device, the partial TSF field 418 in the response relay activation IE 400 may be set to the same value that the partial TSF field 418 in the request relay activation IE 400 was set to. In an alternative aspect, where the response indication field 412 indicates acceptance of or compliance with a request to modify relay operability of a relay-capable device, the partial TSF field 418 may not be present in the response relay activation IE 400. Where the relay activation IE 400 is a response relay activation IE and the response indication field 412 indicates a proposed new time to modify relay operability of a relay-capable device, rather than a rejection, the partial TSF field 418 in the response relay activation IE 400 may be set to the new proposed time. In the above-described manner, a specified time in the future for the modification of the relay operation of a relay device may be negotiated without the need for dissociating with the network in one relay mode and then re-associating with the network in another relay mode.

Figure 5:
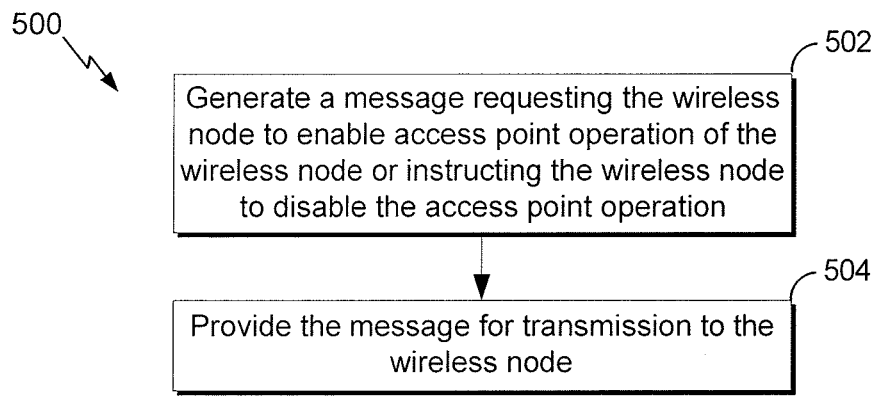
FIG. 5 is a flowchart of a method for modifying relay operation of a wireless node, in accordance with one aspect.

FIG. 5 is a flowchart of a method for modifying relay operation of a wireless node, in accordance with one aspect. The method 500 may be performed by an apparatus for wireless communication that is upstream from the wireless node, for example, the access point (AP) 104 of FIG. 1, which may be shown in more detail as the wireless device 202 of FIG. 2. Furthermore, each step of the following method may correspond to one or more steps and/or features previously described in connection with FIGS. 3 and 4. At block 502, the method includes generating a message requesting the wireless node to enable access point operation of the wireless node or instructing the wireless node to disable the access point operation of the wireless node. For example, the message may comprise a request relay activation IE 300/400 as previously described in connection with FIGS. 3 and 4. Block 502 may be performed by the processor 204 of FIG. 2. At block 504, the method includes providing the message for transmission to the wireless node. Block 504 may be performed by the processor 204 of FIG. 2.

In one aspect, the method may further comprise receiving a response message indicating compliance or non-compliance with the message requesting the wireless node to enable the access point operation. For example, the response message may comprise a response relay activation IE 300/400 as previously described in connection with FIGS. 3 and 4. The response message may be received at the processor 204 via the receiver 212 of FIG. 2, for example. In some aspects, the method may further include embedding the message in one of the following: a probe request frame, a probe response frame, an association request frame, an association response frame, and an action acknowledge frame. The message may be embedded by the processor 204 of FIG. 2, for example. In some aspects, the message may comprise a field indicating whether the message is requesting the wireless node to enable the access point operation or instructing the wireless node to disable the access point operation. Such a field may correspond to the Activate/Deactivate relay operation field 310/410 as previously described in connection with FIGS. 3 and 4. In some aspects, the message may comprise a field indicating a time for the wireless node to enable the access point operation or disable the access point operation. Such a field may correspond to the partial TSF field 318/418 as previously described in connection with FIGS. 3 and 4.

Figure 6:
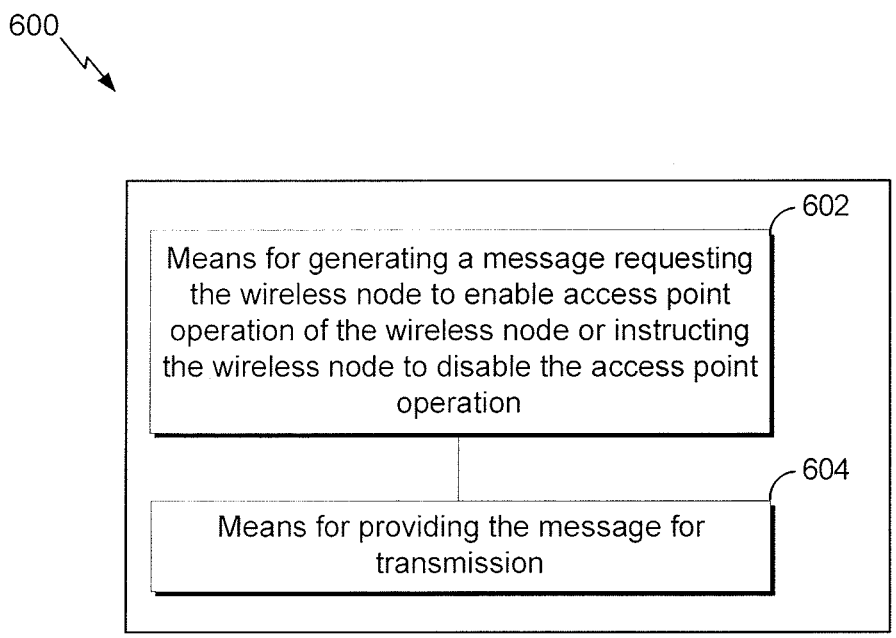
FIG. 6 is a simplified block diagram of several sample aspects of a wireless device, in accordance with one aspect.

FIG. 6 is a simplified block diagram of several sample aspects of a wireless device, in accordance with one aspect. Those skilled in the art will appreciate that the wireless device may have more components than illustrated in FIG. 6. The wireless device 600 includes only those components useful for describing some prominent features or aspects within the scope of the claims. In one aspect, the wireless device 600 is configured to perform the method 500 shown above in FIG. 5. The wireless device 600 may be any suitable wireless device located upstream from a relay-capable wireless device for which modification of relay operation is desired. For example, the wireless device 600 may comprise an access point such as the access point 104 shown in FIG. 1, which may be shown in more detail as the wireless device 202 shown in FIG. 2.

In one aspect, the wireless device 600 includes means for generating a message requesting the wireless node to enable access point operation of the wireless node or instructing the wireless node to disable the wireless relay access point 602. In some aspects, the means 602 may generate the message by generating a relay activation information element. The means 602 may generate the relay activation information element such that the relay activation IE includes one or more of the fields previously described in connection with FIGS. 3 and 4. The means 602 may further generate the message by embedding the relay activation information element in one of the following: a probe request frame, a probe response frame, an association request frame, an association response frame, and an action acknowledge (ACK) frame. In some aspects, the means 602 can be configured to perform one or more of the functions described above with respect to block 502 of FIG. 5. The means 602 may comprise at least the processor 204 shown in FIG. 2, for example.

The wireless device 600 may further include means for providing the message for transmission 604. In some aspects, the means 604 may provide the message for transmission by transferring the message generated by means 602 to a buffer or memory device within the wireless device 600. The means 604 may then provide the message to a transmitter, which may transmit the message via one or more antennas. For example, as shown in connection with FIG. 2, the means 604 may comprise at least the processor 204. In some aspects, the means 604 may additionally comprise one or both of the memory 206 and the transmitter 210. Thus, as shown in connection with FIG. 2, the processor 204 may be configured to transfer the message to a buffer within the memory 206, for example, and then may be configured to provide the message from the memory 206 to the transmitter 210 for transmission via the antenna 216.

In some aspects, the wireless device 600 may further include means for receiving a response message indicating compliance or non-compliance with the request (not shown in FIG. 6). In an aspect, the means for receiving may be configured to perform one or more of the functions described above with respect to the method 500 of FIG. 5. The means for receiving may comprise at least the receiver 212 shown in FIG. 2, for example.

Figure 7:
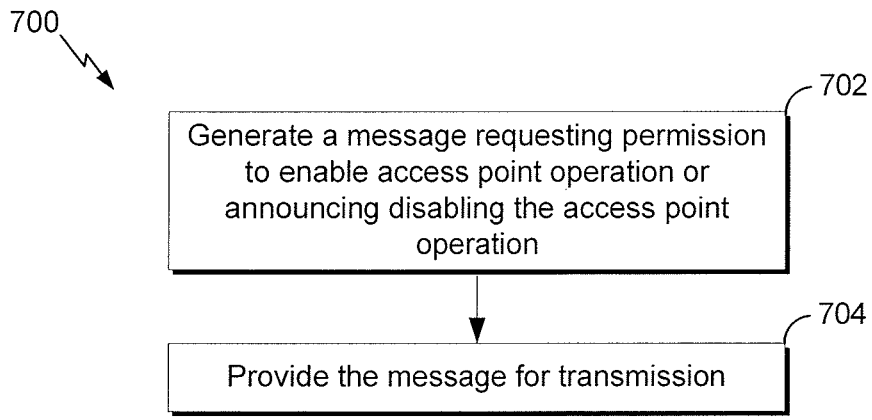
FIG. 7 is a flowchart of a method for modifying relay operation, in accordance with another aspect.

FIG. 7 is a flowchart of a method for modifying relay operation, in accordance with another aspect. The method 700 may be performed by a relay-capable wireless node, for example, any of the relay devices 105a-105c of FIG. 1, which may be shown in more detail as the wireless device 202 of FIG. 2. Furthermore, each step of the following method may correspond to one or more steps and/or features previously described in connection with FIGS. 3 and 4. At block 702, the method includes generating a message requesting permission to enable access point operation of the apparatus or announcing disabling the access point operation of the apparatus. For example, the message may comprise a request relay activation IE 300/400 as previously described in connection with FIGS. 3 and 4. Block 702 may be performed by the processor 204 of FIG. 2. At block 704, the method includes providing the message for transmission. Block 704 may be performed by the processor 204 of FIG. 2.

In one aspect, the method may further comprise receiving a response message granting or denying the permission to enable the access point operation of the apparatus. For example, the response message may comprise a response relay activation IE 300/400 as previously described in connection with FIGS. 3 and 4. The response message may be received at the processor 204 via the receiver 212 of FIG. 2, for example. In some aspects, the method may further include embedding the message in one of the following: a probe request frame, a probe response frame, an association request frame, an association response frame, and an action acknowledge frame. The message may be embedded as described above by the processor 204 of FIG. 2, for example. In some aspects, the message may comprise a field indicating whether the message is requesting the permission to enable the access point operation or announcing disabling the access point operation. Such a field may correspond to the Activate/Deactivate relay operation field 310/410 as previously described in connection with FIGS. 3 and 4. In some aspects, the message may comprise a field indicating a time to disable the access point operation of the apparatus or enable the access point operation of the apparatus. Such a field may correspond to the partial TSF field 318/418 as previously described in connection with FIGS. 3 and 4. In some aspects, the message may comprise a field indicating a number of wireless stations currently associated with the access point operation. Such a field may correspond to the station count field 316/416 as previously described in connection with FIGS. 3 and 4. Furthermore, in some aspects, where a relay device disables its wireless relay access point, the method may further comprise generating at least one dissociation message for dissociating with at least one wireless node associated with the access point operation if the relay access point of the apparatus is disabled. In this manner, wireless stations previously associated with a relay device will not remain associated with the relay device that no longer provides relay functionality for the previously associated wireless stations.

Figure 8:
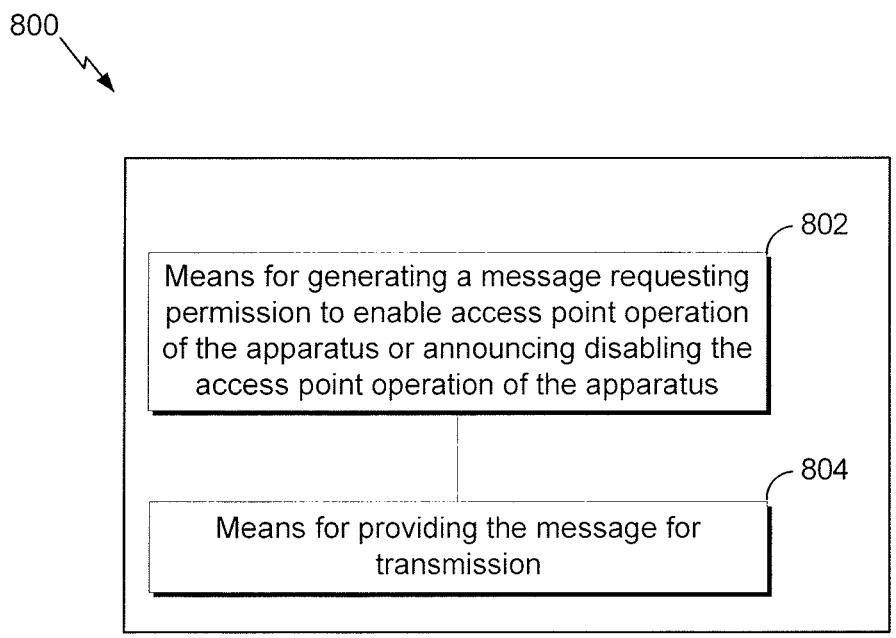
FIG. 8 is a simplified block diagram of several sample aspects of a wireless device, in accordance with another aspect.

FIG. 8 is a simplified block diagram of several sample aspects of a wireless device, in accordance with one aspect. Those skilled in the art will appreciate that the wireless device may have more components than illustrated in FIG. 8. The wireless device 800 includes only those components useful for describing some prominent features or aspects within the scope of the claims. In one aspect, the wireless device 800 is configured to perform the method 700 shown above in FIG. 7. The wireless device 800 may be any suitable relay-capable wireless device for which modification of relay operation is desired. For example, the wireless device 800 may comprise any one of the relay devices 105*a*-105*c* shown in FIG. 1, which may be shown in more detail as the wireless device 202 shown in FIG. 2.

In one aspect, the wireless device 800 includes means for generating a message requesting permission to enable access point operation of the apparatus or announcing disabling the access point operation of the apparatus 802. In some aspects, the means 802 may generate the message by generating a relay activation information element. The means 802 may generate the relay activation information element such that the relay activation IE includes one or more of the fields previously described in connection with FIGS. 3 and 4. The means 802 may further generate the message by embedding the relay activation information element in one of the following: a probe request frame, a probe response frame, an association frame, an association response frame, and an action acknowledge (ACK) frame. In some aspects, the means 802 can be configured to perform one or more of the functions described above with respect to block 702 of FIG. 7. The means 802 may comprise at least the processor 204 shown in FIG. 2, for example.

The wireless device 800 may further include means for providing the message for transmission 804. In some aspects, the means 804 may provide the message for transmission by transferring the message generated by means 802 to a buffer or memory device within the wireless device 800. The means 804 may then provide the message to a transmitter, which may transmit the message via one or more antennas. For example, as shown in connection with FIG. 2, the means 804 may comprise at least the processor 204. In some aspects, the means 804 may additionally comprise one or both of the memory 206 and the transmitter 210. Thus, as shown in connection with FIG. 2, the processor 204 may be configured to transfer the message to a buffer within the memory 206, for example, and then may be configured to provide the message from the memory 206 to the transmitter 210 for transmission via the antenna 216.

In some aspects, the wireless device 800 may further include means for receiving a response message granting or denying the permission to enable the access point operation of the apparatus (not shown in FIG. 8). In an aspect, the means for receiving may be configured to perform one or more of the functions described above with respect to the method 700 of FIG. 7. The means for receiving may comprise at least the receiver 212 shown in FIG. 2, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for modifying relay operation of a wireless node, the apparatus comprising:
a processing system configured to generate a message requesting that the wireless node to enable access point operation of the wireless node for one or more stations coupled to the wireless node or instructing the wireless node to disable the access point operation of the wireless node for the one or more stations coupled to the wireless node, wherein wireless communication with the wireless node is enabled if the access point operation is disabled; and
a communication circuit configured to transmit the message, via a downlink, to the wireless node via the wireless communication.

2. The apparatus of claim 1, wherein the communication circuit is further configured to receive a response message indicating compliance or non-compliance with the message requesting the wireless node to enable the access point operation.

3. The apparatus of claim 1, wherein the message comprises a relay activation information element, wherein the processing system is further configured to set at least one bit in the relay activation information element to indicate the request or the instruction.

4. The apparatus of claim 1, wherein the communication circuit is configured to embed the message in one of the following: a probe request frame, a probe response frame, an association request frame, an association response frame, and an action acknowledge frame.

5. The apparatus of claim 1, wherein the message comprises a field indicating a time for the wireless node to enable the access point operation or disable the access point operation, wherein the processing system is further configured to set a value of the field to indicate the time.

6. The apparatus of claim 1, wherein the message comprises a field for indicating a number of the one or more stations for which the wireless node provides the access point operation, wherein the processing system is further configured to set a value of the field to indicate the number.

7. The apparatus of claim 1, wherein the processing system is further configured to process a message from the wireless node announcing disabling the access point operation of the wireless node or requesting permission to enable the access point operation of the wireless node.

8. A method for modifying relay operation of a wireless node, the method comprising:
generating a message requesting that the wireless node to enable access point operation of the wireless node for one or more stations coupled to the wireless node or instructing the wireless node to disable the access point operation of the wireless node for one or more stations coupled to the wireless node, wherein wireless communication with the wireless node is enabled if the access point operation is disabled; and
providing the message for transmission to the wireless node via a downlink on the wireless communication.

9. The method of claim 8, further comprising receiving a response message indicating compliance or non-compliance with the message requesting the wireless node to enable the access point operation.

10. The method of claim 8, wherein the message comprises a relay activation information element comprising at least one bit to indicate the request or the instruction.

11. The method of claim 8, further comprising embedding the message in one of the following: a probe request frame, a probe response frame, an association request frame, an association response frame, and an action acknowledge frame.

12. The method of claim 8, wherein the message comprises a field indicating a time for the wireless node to enable the access point operation or disable the access point operation.

13. The method of claim 8, wherein the message comprises a field indicating a number of the one or more stations for which the wireless node provides the access point operation.

14. The method of claim 8, further comprising processing a message from the wireless node announcing disabling the access point operation of the wireless node or requesting permission to enable the access point operation of the wireless node.

15. An apparatus for modifying relay operation, the apparatus comprising:
a processing system configured to generate a message requesting permission to enable access point operation of the apparatus for one or more stations coupled to the apparatus or announcing disabling the access point operation of the apparatus for the one or more stations coupled to the apparatus, wherein wireless communication with the apparatus is enabled if the access point operation is disabled; and
a communication circuit configured to transmit the message, via an uplink and via the wireless communication.

16. The apparatus of claim 15, wherein the communication circuit is further configured to receive a response message granting or denying the permission to enable the access point operation of the apparatus.

17. The apparatus of claim 15, wherein the message comprises a relay activation information element, wherein the processing system is further configured to set at least one bit in the relay activation information element to indicate the request or the announcement.

18. The apparatus of claim 15, wherein the communication circuit is configured to embed the message in one of the following: a probe request frame, a probe response frame, an association request frame, an association response frame, and an action acknowledge frame.

19. The apparatus of claim 15, wherein the message comprises a field indicating a time to disable the access point operation of the apparatus or enable the access point operation of the apparatus, wherein the processing system is further configured to set a value of the field to indicate the time.

20. The apparatus of claim 15, wherein the message comprises a field indicating a number of the one or more stations for which the apparatus provides the access point operation, wherein the processing system is further configured to set a value of the field to indicate the number.

21. The apparatus of claim 15, wherein the processing system is further configured to generate at least one dissociation message for dissociating with at least one wireless node for which the apparatus provides the access point operation if the access point operation of the apparatus is disabled.

22. A method performed by an apparatus for modifying relay operation of the apparatus, the method comprising:
generating a message requesting permission to enable access point operation of the apparatus for one or more stations coupled to the apparatus or announcing disabling the access point operation of the apparatus for one or more stations coupled to the apparatus, wherein wireless communication with the apparatus is enabled if the access point operation is disabled; and
providing the message for transmission via an uplink on the wireless communication, wherein wireless communication by the apparatus is enabled if the access point operation is disabled.

23. The method of claim 22, further comprising receiving a response message granting or denying the permission to enable the access point operation.

24. The method of claim 22, wherein the message comprises a relay activation information element comprising at least one bit to indicate the request or the announcement.

25. The method of claim 22, further comprising embedding the message in one of the following: a probe request frame, a probe response frame, an association request frame, an association response frame, and an action acknowledge frame.

26. The method of claim 22, wherein the message comprises a field indicating a time to disable the access point operation or enable the access point operation.

27. The method of claim 22, wherein the message comprises a field indicating a number of the one or more stations currently associated with the access point operation.

28. The method of claim 22, further comprising generating at least one dissociation message for dissociating with at least one wireless node associated with the access point operation if the access point operation is disabled.

29. The apparatus of claim 1, the apparatus is configured as a wireless node.

30. The apparatus of claim 15, wherein the apparatus is configured as a wireless node.

* * * * *